United States Patent [19]

Wirt et al.

[11] 3,824,842

[45] July 23, 1974

[54] APPARATUS AND METHOD FOR THE MEASUREMENT OF ACOUSTIC ABSORPTION AND IMPEDANCE

[75] Inventors: Leslie Spencer Wirt, Newhall; Duane Lloyd Morrow, Saugus, both of Calif.

[73] Assignee: Lockheed Aircraft Corporation, Burbank, Calif.

[22] Filed: Apr. 20, 1972

[21] Appl. No.: 245,776

[52] U.S. Cl. ................................................ 73/69
[51] Int. Cl. ......................................... G01n 29/00
[58] Field of Search ..................... 73/67, 67.1, 69; 181/0.5 NP, 0.5 AP; 324/58 B, 58.5 B

[56] References Cited
UNITED STATES PATENTS

| | | | |
|---|---|---|---|
| 1,816,917 | 8/1931 | Smythe et al. | 73/67.1 X |
| 2,043,984 | 6/1936 | Alder | 73/69 |
| 2,680,837 | 6/1954 | Sensiper | 181/.5 NP |

Primary Examiner—Richard C. Queisser
Assistant Examiner—John P. Beauchamp
Attorney, Agent, or Firm—George C. Sullivan; Ralph M. Flygare

[57] ABSTRACT

Apparatus and method for measuring the acoustical impedance and/or the absorption coefficient of materials of the class which exhibit nonlinear behavior at high sound intensities. A high-intensity biasing noise having a broadband spectrum and a low intensity pure sinusoidal tracer tone are introduced in combination into a standard impedance tube or standing-wave apparatus. The standing-wave pattern in the tube is measured by a pressure microphone probe movable along the axis of the tube. The tracer tone is retrieved by highly selective filtering and used to provide a measurement signal which corresponds to the response of the material. By sampling the standing wave pattern in the tube, the entire spectrum of the broadband noise response may be obtained.

21 Claims, 6 Drawing Figures

APPARATUS AND METHOD FOR THE MEASUREMENT OF ACOUSTIC ABSORPTION AND IMPEDANCE

BACKGROUND OF THE INVENTION

This invention relates to measurement of acoustical impedance, and/or absorption coefficient, and more particularly, to apparatus and method for measuring the acoustical properties of that class of materials which exhibit nonlinearity with changes in the intensity of the acoustic environment. As is well known to those versed in the art, it is frequently desirable to obtain the acoustic impedances of various materials in order to develop improved noise control materials and devices. Such noise control devices include, by way of example, lined ducts for containing high-velocity air flow and intense sound such as may be found in aircraft jet engines. Heretofore various means and methods have been proposed for making such measurements. A widely accepted technique of the prior art involves the use of a standing-wave tube. Standards for such tubes have been set forth by the American Society for Testing Materials and are described in "Standard Method of Test for Impedance and Absorption of Acoustical Materials by the Tube Method," (ASTM Designation: C 384-58, 1958 — ASTM Std., Part 5, 997–1009, 1961). Which publication is incorporated herein by reference.

In general, prior art methods, including the ASTM standard test, make the tacit assumption that the quantities being measured are functions of frequency but are independent of the intensity of the (sinusoidal) test signal. That is to say that it is assumed that the material is linear in its acoustical behavior. More recently, when such necessary methods are applied to materials known to be nonlinear, the intensity of the test signal sometimes has been stated as a test condition.

It has now been discovered experimentally that the nonlinearity of an acoustical material has a further consequence. Specifically, if the use of a particular sinusoidal test signal results in the observation of an acoustic impedance $Z_1$ at frequency $F_1$, then the superposition of additional sound at frequencies other than $F_1$, such as for example broadband noise, causes the impedance to change to some value $Z_2$ even though all measurements are made at the original frequency $F_1$ only. The more nonlinear the material being tested, the more pronounced this effect becomes. Thus, the impedance at each frequency $F_1$ is a function of both the level and the spectrum shape of the entire noise present in the materials environment and if the level of a pure tone at $F_1$ is less than the overall level of the rest of the noise spectrum then the measured impedance becomes independent of the level of the sinusoidal signal at the frequency $F_1$. This discovery requires the modification of the more usual definition of acoustical inpedance to include a statement of the acoustical environment to which the material is exposed. The present invention, as will be described below, provides a means for modifying and adapting the standard test apparatus and method to conveniently measure acoustic impedance in accordance with the revised definition.

It is recognized that prior attempts have been made to calculate the impedance of nonlinear materials in the presence of other noise. The problem involves the mathematical intractibility which characterizes nonlinear systems. In principle, however, it is solvable at least by successive approximation. The novel and improved method of the present invention provides a practical means for experimentally checking such analyses.

BRIEF SUMMARY OF THE INVENTION

The method of the present invention comprises injecting a pure tracer tone into a high-intensity, shaped, random noise spectrum which is then propagated in a standing wave tube apparatus. The broadband noise comprises the basic test signal. The output of a pressure microphone probe, sampling the standing-wave pattern in the tube, is supplied to a narrow band tracking filter to retrieve the pure tracer tone from the mixture of the pure tone and the broadband high-intensity noise signal. The extracted tracer signal corresponds to the position versus pressure signal at the probe tip. The absorption coefficient and acoustical impedance are derived from the position and relative amplitude of the minima and maxima of the standing wave pattern in the conventional manner.

Thus, there is provided by the present invention means for obtaining the absorption coefficients and acoustical impedances of nonlinear acoustical materials at high sound intensities, which cannot otherwise be determined. A consequence of the invention is that it has been shown that conventional procedures for the operation of high intensity standing wave apparatus are inadequate in that they cannot provide a definition of material characteristics suitable for insertion into the wave equation as boundary conditions. In accordance with the present invention, as it applies to nonlinear materials, the word "impedance" is redefined as follows: The impedance at the surface of a nonlinear acoustic material is the ratio of the sound pressure to the normal component of the particle velocity, at a particular frequency, and in the presence of a specified sound spectrum.

DETAILED DESCRIPTION OF THE PREFERRED EMBODIMENT

Figure 1:
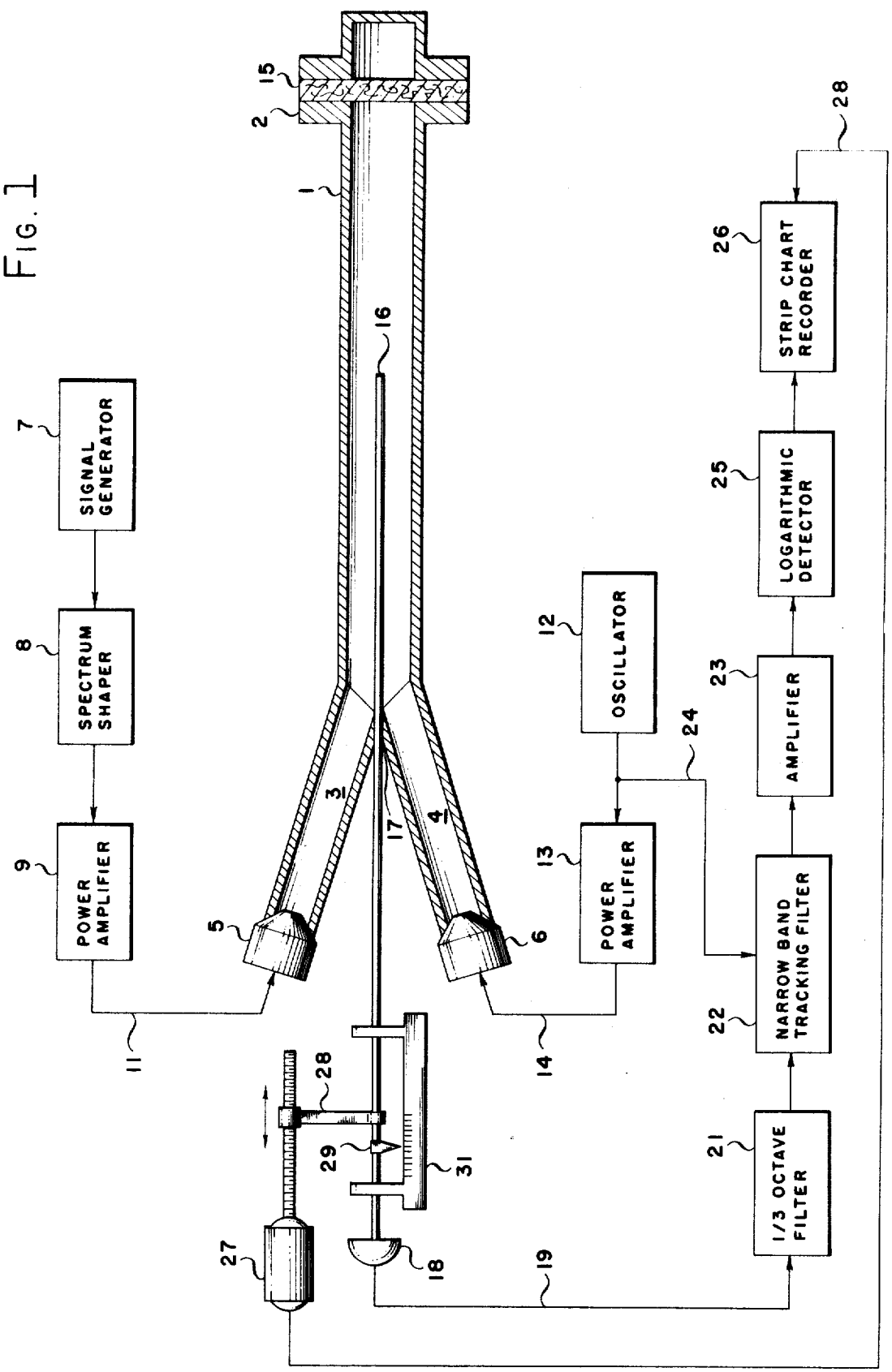
FIG. 1 is a block diagram of a preferred embodiment of the invention.

The invention comprises the measurement of acoustical impedance and absorption coefficients of various materials, and particularly those materials comprising the class which exhibit nonlinear behavior at high intensities of sound. Apparatus constructed in accordance with the invention and which is useful in carrying out the method of the invention, is illustrated schematically in FIG. 1.

An elongated tubular chamber, comprising tube 1, is closed at one end by means of termination 2. The opposite end of the tube 1 is provided with waveguides 3 and 4 which may be of exponential flare or other suitable shape. Electroacoustic driver unit 5 is coupled to throat 3, and electroacoustic driver unit 6 is coupled to throat 4. In the interest of clarity only two driver units, 5 and 6, and their respective throats 3 and 4, are shown in the drawing. However, in a practical construction it is preferred that four such driver units and horns be coupled to the standing-wave tube 1 in order to effectively handle the desired acoustic power levels. To minimize phase cancellation among the several driver units, the waveguides 3 and 4 converge at a minimal angle of about 9° from the axis of the measuring section comprising tube 1. It is preferred that the convergence angle of waveguides 3 and 4 not exceed approximately 30° from the major axis of the chamber. Each driver unit (e.g., 5,6) is energized from its own power amplifier.

A signal generator 7, comprising a broadband noise source, has its output supplied to a spectral shaper 8 to yield a broadband noise signal shaped to resemble that of the noise encountered in the normal operating environment of the test specimen. Spectrum shaper 8 may be selectively adjustable with respect to the noise spectra and level desired for any given test specimen. The shaped broadband noise signal is amplified by power amplifier 9 and used to energize driver unit 5. The signal on line 11 comprises the high-intensity biasing noise and is designated by spectrum shape and overall level. In a typical application, the broadband noise propagated into the chamber is at an overall level greater than 100 decibels, where 0 decibels equals 0.0002 dyne per square centimeter. In almost all practical applications of acoustic materials to high-intensity sound problems, the actual noise comprises many frequencies and is commonly broadband noise. It is preferred that three driver units, such as the single unit indicated at 5, and their ancillary amplifiers be used in combination to supply the high-intensity broadband noise to the standing wave tube 1.

Sinewave oscillator 12 provides a pure sinewave tracer tone which is amplified by power amplifier 13 and supplied to driver unit 6. Since the pure sinusoidal tone is at a level which is always low as compared to the overall sound intensity propagated into tube 1 by the broadband noise source, only a single driver unit 6 need be employed for this purpose.

While the described embodiment utilizes separate driver units and associated amplifiers for the tracer signal and the biasing signal, it should be understood that the tracer signal could be electronically mixed with the biasing signal and supplied to a single driver unit of appropriate power-handling capability.

The test specimen 15 is interposed between termination 2 and the specimen-receiving end of tube 1. It is preferred that the surface area of the specimen 15 equal the cross sectional area of the impedance tube 1. A small microphone or slender, hollow probe tube 16 is movably disposed on the axis of the measuring tube 1. A seal 17 is provided at the sound input end of tube 1, through which probe 16 extends. The movable probe 16 is connected to a pressure microphone 18 which supplies an output signal on line 19 to ⅓-octave filter 21.

Filter 21 is cascaded with a narrow-band tracking filter 22, having a bandwidth, in a typical construction, of 1.8 Hertz (Hz). To ficilitate tracking, it is preferred that the narrow-band tracking filter 22 have a selectively adjustable center frequency. Cascaded filters 21 and 22 accomplish the retrieval of the tracer sinewave signal which is then supplied to amplifier 23. In order to overcome any possible instability of oscillator 12, the narrow-band tracking filter 22 is tuned by the pure tone tracer signal itself via line 24 from oscillator 12. The amplified tracer signal is supplied to logarithmic detector 25, the output of which is used to drive strip chart recorder 26.

The motor 27 and lead-screw mechanism 28 assembly mechanically drives or translates probe 16 along the axis of the measuring section of tube 1 in order to sense the maxima and minima of the standing-wave pattern within the tube. That is, the sound pressure at the tip of the probe 16 will be sensed and converted into an electrical signal which is ultimately converted to a plot on the strip chart recorder 26. Th translation of the probe, by motor 27, is synchronized with the chart feed of recorder 26 to provide the desired amplitude-versus-position plot. Displacement of the probe may also be observed directly by means of pointer 29 and scale 31. The absorption coefficient, acoustic impedance, acoustic resistance, and other parameters of the specimen, are calculated from the position and relative magnitude of the minima and maxima of the standing wave pattern in the tube, as will be readily understood by those skilled in the art. Reference may be had to "Acoustical Engineering" by Harry F. Olson (D. Van Nostrand Company, Inc.), Second edition, pages 383–384, for a description of the derivation of sound absorption coefficient, acoustical resistance, acoustical reactance, and acoustical impedance from measured data. The relevant subject matter of the foregoing publication, "Acoustical Engineering," incorporated herein by reference.

In a typical construction, microphone 18 may comprise a condenser microphone acoustically coupled to probe 16.

Figure 2:
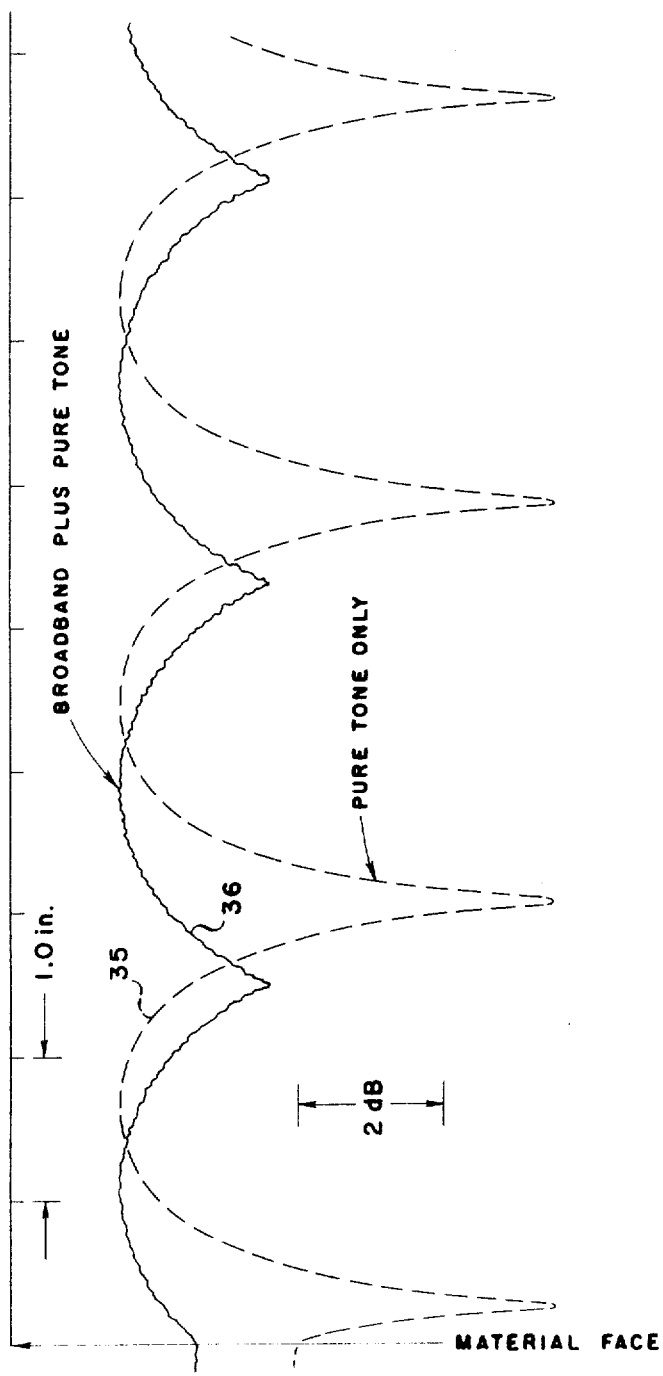
FIG. 2 illustrates graphically the standing-wave patterns observed in the presence and absence of broadband bias noise.

There is shown in FIG. 2 the superposition of typical strip chart recordings made by the conventional method (viz, sinewave test signal only), as indicated by line 35, and by the method of the present invention (viz, low-level sinewave tracer signal plus high-level broadband bias signal), as indicated by line 36. Note the changes in both the location of the minima and the level of the minima. The impedance and absorption coefficients calculated from the two traces differ considerably. Tests made using the method of this invention at different levels of the broadband noise show similar differences. This indicates that both the spectrum shape and the level of the broadband noise must be stated as a test condition. On the other hand, once the broadband noise is present, the level of the sinusoidal tracer signal may be varied over a wide range without significantly changing the test results so long as the level of the tracer is kept less than the overall level of the broadband noise.

Figure 3:
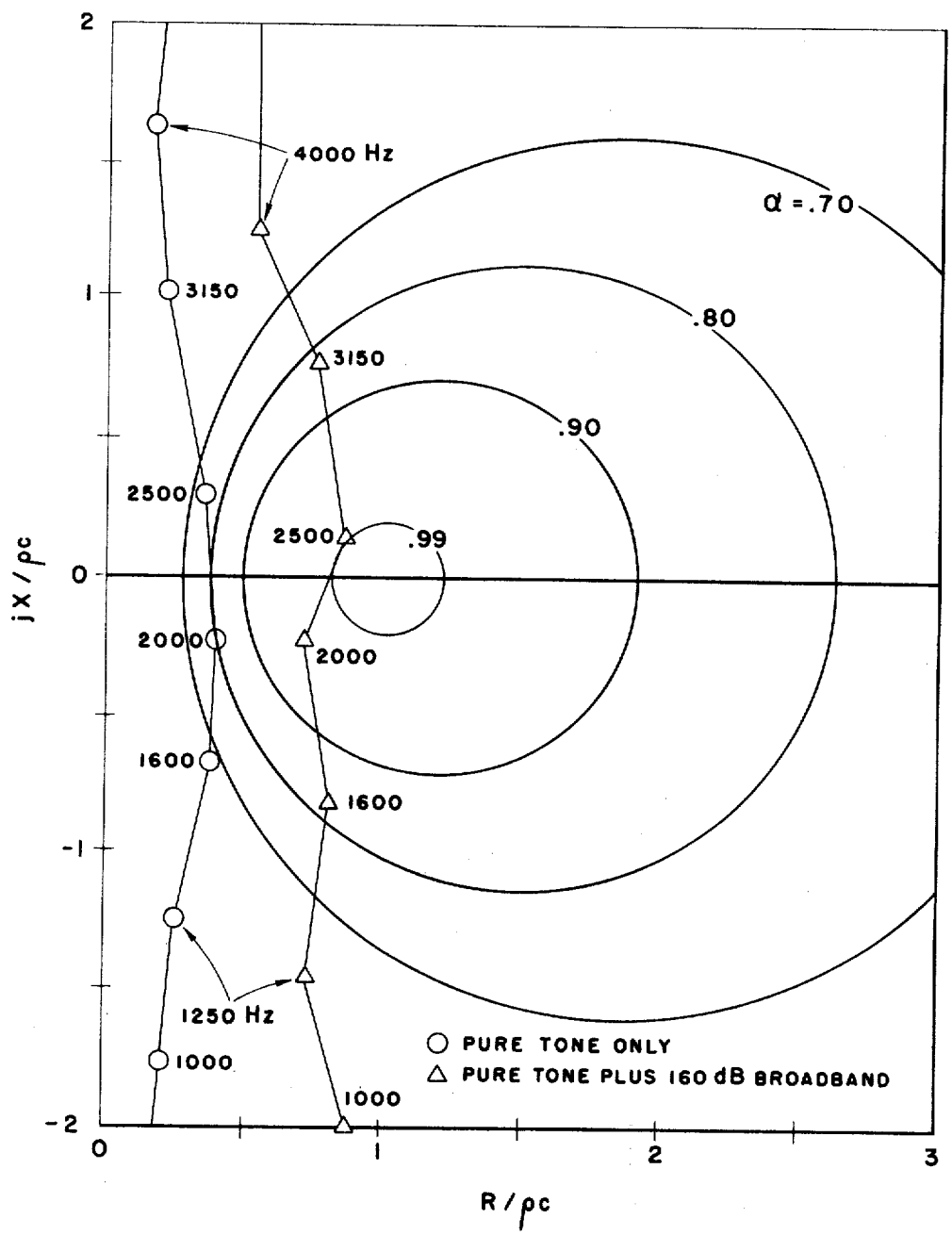
FIG. 3 illustrates graphically the impedances obtained from a first test sample in accordance with the method of the invention, and those obtained by prior methods.
Figure 4:
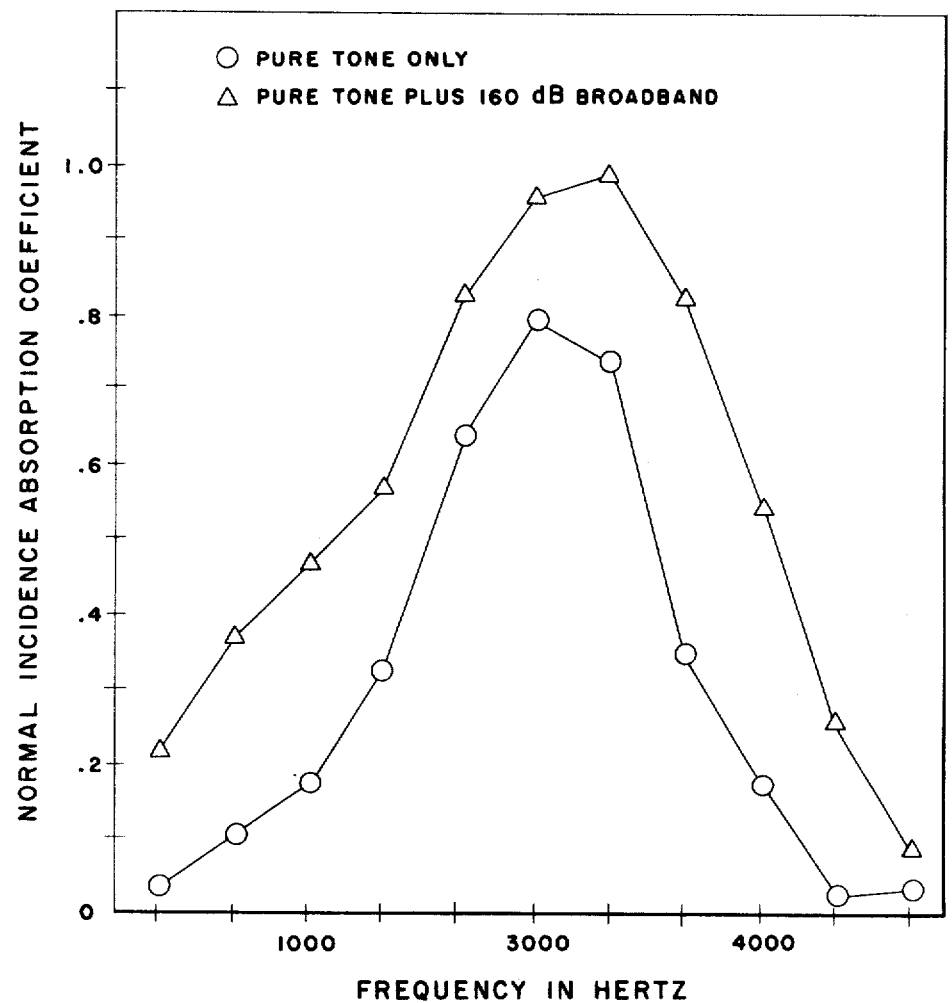
FIG. 4 is a graphic diagram illustrating the absorption coefficients of the sample referred to in FIG. 3.

FIG. 3 illustrates the dramatic change in impedance loci that results from the presence or absence of the broadband noise in the case of a test specimen comprising a typical perforated material. The coordinate axes are normalized by the characteristic impedance $\rho c$ where $\rho$ is the fluid density and $c$ is the velocity of sound. $\rho c = 42$ c.g.s. units for room temperature air. The non-concentric circles are contours of equal absorption coefficient. With their aid the absorption coefficients may be read directly from the impedance plots. Absorption coefficient is related to impedance by the relation:

$$\alpha = 4(R/\rho c)/(R/\rho c + 1)^2 + (X/\rho c)^2$$

where
$\alpha$ = absorption coefficient
$R$ = acoustic resistance
$X$ = acoustic reactance FIG. 4 illustrates the change in absorption coefficients $\alpha$ more directly by showing $\alpha$ versus frequency for the test specimen described in connection with FIG. 3.

Figure 5:
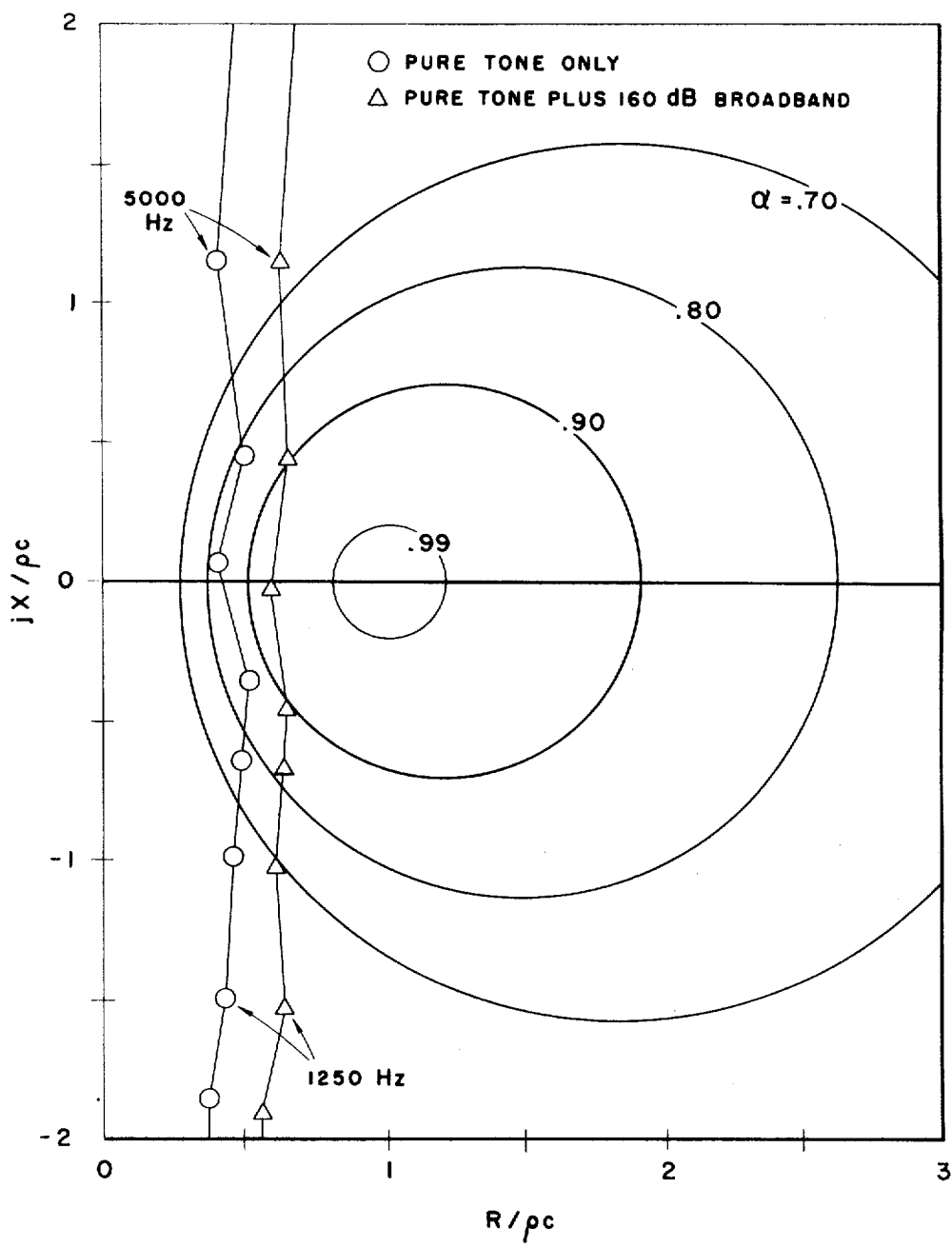
FIG. 5 is a graphic diagram illustrating an impedance plot obtained from a second test sample in accordance with the method of the invention, and the plot obtained by prior methods.
Figure 6:
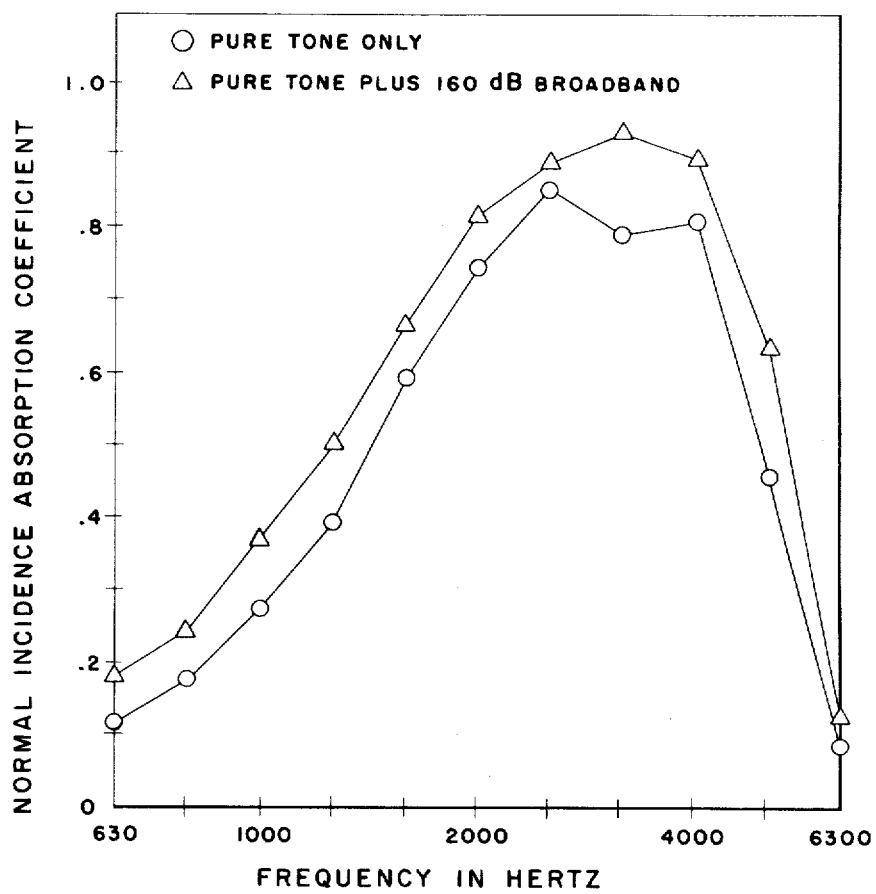
FIG. 6 is a graphic diagram illustrating the absorption coefficients of the sample referred to in FIG. 5.

FIGS. 5 and 6 show the lesser changes in impedance and absorption that are obtained with a test specimen comprising a much more linear material, namely the commercial produce identified as "Feltmetal" type FM-186.

In summary, from the foregoing it will be seen that the present invention provides a novel and improved method and apparatus for the measurement of certain acoustic phenomena. A specimen in a standing-wave tube is exposed to the combination of a low-level pure tracer tone and a broadband noise of predetermined spectral shape and level. Extraction of the tracer tone yields a measurement signal from which an analysis of the sound absorption and reflection characteristics of the specimen may be obtained. In accordance with the invention the impedance of nonlinear materials has been redefined and conventional methods of measurement have been modified. The improvements attributable to the invention lead directly to the creation of new and improved sound absorbing materials and devices. It should be understood, however, that while the invention has been shown and described as it relates to the measurement of acoustic phenomena (for which purpose it is especially suitable), it will be recognized by those versed in the art as being readily applicable to like measurements in other physical disciplines. Thus, it is properly considered as a generalized method for measuring a frequency-dependent variable in a non-linear system.

What is claimed is:

1. Apparatus for measuring the acoustical properties of a non-linear test specimen, comprising:
    a standing-wave chamber having a sound-input end and a specimen-receiving end;
    means for disposing said specimen at said specimen-receiving end of said chamber,
    first sound generator means for propagating an acoustic broadband signal into said sound-input end of said chamber at a level sufficient to reach the non-linear regime of said specimen;
    second sound generator means for propagating a single-frequency acoustical tracer signal into said sound-input end of said chamber, said tracer signal having an intensity less than the intensity of said broadband signal;
    pickup means for sensing the maxima and minima of the standing-wave pattern generated within said chamber and providing corresponding output signals;
    filter means for extracting said tracer signal from said output signals; and,
    means for providing an indication of the amplitude of said tracer signal as a function of the position of said pickup means within said chamber.

2. Apparatus as defined in claim 1 wherein said chamber comprises an elongated tube and wherein said pickup means is adapted to sense said standing-wave pattern along the major axis of said chamber.

3. Apparatus as defined in claim 1 wherein said second sound generator means comprises a sinewave signal source, and including an electroacoustical transducer operatively connected to said sources.

4. Apparatus as defined in claim 2 wherein the surface area of said specimen is substantially coextensive with the cross-sectional area of said chamber.

5. Apparatus as defined in claim 1 wherein said first sound generator means propagates broadband noise into said chamber at an overall level greater than 100 decibels, where 0 decibels equals 0.0002 dyne per square centimeter.

6. Apparatus as defined in claim 5 wherein the spectrum and level of said broadband noise is shaped to be substantially the same as that encountered in the normal operating environment of said specimen.

7. Apparatus as defined in claim 1 wherein said second sound generator means propagates a sinewave tone into said chamber at a level lower than the level of the acoustic energy from said first sound generator means.

8. Apparatus as defined in claim 1 wherein said pickup means comprises:
    a pressure-responsive microphone having a movable probe connected thereto.

9. Apparatus as defined in claim 1 wherein said filter means comprises:
    a ⅓-octave electrical filter; and
    a narrow-band-pass tracking filter connected in cascade with said ⅓-octave electrical filter, the center frequency of which is selectively adjustable.

10. Apparatus as defined in claim 9 including:
    means connecting said tracking filter to said second sound generator means to cause said center frequency to correspond to the frequency of said tracer signal.

11. Apparatus as defined in claim 1 including:
    drive means connected to said pickup means and to said indication means for synchronous movement thereof.

12. Apparatus as defined in claim 1 wherein said first sound generator means comprises:
    an electroacoustical transducer.

13. Apparatus as defined in claim 1 wherein said second sound generator means comprises:
    an electroacoustical transducer.

14. Apparatus as defined in claim 1 wherein said first and second sound generators each comprise:
    an electroacoustical transducer.

15. Apparatus as defined in claim 14 including:
    first and second waveguides interposed between respective ones of said transducers and said sound input end of said chamber, said waveguides converging at an angle less than approximately 30° from the major axis of said chamber.

16. Apparatus for measuring acoustical properties of a non-linear test specimen, comprising:
    an elongated standing-wave tube having a sound input end and a specimen receiving end;

means for disposing said specimen at said specimen-receiving end of said tube;

a broadband noise generator;

spectrum shaper means connected to said noise generator for selectively adjusting the spectrum and level of the output therefrom;

a first electroacoustic transducer for propagating high-intensity sound into said tube in response to an electrical input;

first power amplifier means responsive to the output of said shaper means to provide an electrical input to said first transducer;

a sinewave oscillator;

a second electroacoustic transducer for propagating a low-intensity sound into said tube in response to an electrical input;

second power amplifier means responsive to the output of said oscillator to provide an electrical input to said second transducer;

movable pressure microphone means translatable along the axis of said tube for sensing the maximum and minimum sound pressure in the standing wave generated therein and generating a corresponding output signal;

filter means connected to the output of said microphone means for extracting from said output signal that portion which corresponds to said low-intensity sound; and indicator means responsive to the extracted signal output from said filter means to provide an indication of sound pressure versus position of said microphone means.

17. Apparatus as defined in claim 16 including:

means connecting said filter means to said oscillator to cause the frequency of the extracted signal output to correspond to the frequency of said low-intensity sound propagated by said second transducer.

18. The method of measuring acoustical properties of a non-linear specimen, comprising the steps of:

exposing said test specimen to a biasing noise signal in a standing-wave tube;

simultaneously exposing said specimen to a pure tracer tone, the amplitude of which is less than the amplitude of said biasing noise signal; and sensing the maxima and minima of said tracer tone, to the exclusion of said biasing noise signal, as a function of distance along the axis of said standing-wave tube.

19. The method defined in claim 18 wherein said biasing noise signal comprises a broadband noise signal having a sound pressure level greater than 100 decibels, where 0 decibels equals 0.0002 dyne per square centimeter.

20. The method defined in claim 18 wherein said biasing noise signal has a predetermined spectrum shape and sound pressure level.

21. The method defined in claim 18 wherein the spectrum and level of said broadband noise signal is shaped to be substantially the same as that encountered in the normal operating environment of said test specimen.

* * * * *